United States Patent
Dropmann et al.

(10) Patent No.: US 6,202,804 B1
(45) Date of Patent: Mar. 20, 2001

(54) ELECTROMAGNETICALLY RELEASABLE FRICTION SAFETY BRAKE

(75) Inventors: Christoph Dropmann, Kaufbeuren; Karl Schilling, Marktoberdorf, both of (DE)

(73) Assignee: Chr. Mayr GmbH & Co. KG, Mauerstetten (DE)

( * ) Notice: Subject to any disclaimer, the term of this patent is extended or adjusted under 35 U.S.C. 154(b) by 0 days.

(21) Appl. No.: 09/202,834

(22) PCT Filed: Jun. 27, 1997

(86) PCT No.: PCT/EP97/03386

§ 371 Date: Feb. 8, 1999

§ 102(e) Date: Feb. 8, 1999

(87) PCT Pub. No.: WO98/01681

PCT Pub. Date: Jan. 15, 1998

(30) Foreign Application Priority Data

Jul. 5, 1996 (DE) .......................................... 296 11 732 U

(51) Int. Cl.[7] .................................................. B60T 13/04
(52) U.S. Cl. ........................................... 188/171; 188/71.5
(58) Field of Search .................................... 188/171, 173, 188/71.5

(56) References Cited

U.S. PATENT DOCUMENTS

| 1,588,129 | 6/1926 | Morgan . |
| 3,446,322 | 5/1969 | Wrensch . |
| 4,170,278 | * 10/1979 | Schubert ............................. 188/171 |
| 4,878,568 | 11/1989 | Fossum . |
| 5,199,532 | * 4/1993 | Suganuma ........................... 188/171 |

FOREIGN PATENT DOCUMENTS

| 300941 | 2/1914 | (DE) . |
| 1768425 | 6/1958 | (DE) . |
| 1914395 | 4/1965 | (DE) . |
| 2901784 | 8/1979 | (DE) . |
| 295 10 828 U | 10/1995 | (DE) . |
| 0078944 | 5/1983 | (EP) . |
| 0366920 | 5/1990 | (EP) . |
| 0465831 | 1/1992 | (EP) . |

OTHER PUBLICATIONS

Baumann, W.: Bauarten und Eigenschaften elektromagnetisch gelufteter Bremsen an Stoppmotoren. In: Konstruktion, 21, 1969, H.4, S. 137–147.

* cited by examiner

*Primary Examiner*—Michael Mar
*Assistant Examiner*—Devon Kramer
(74) *Attorney, Agent, or Firm*—Ladas & Parry

(57) ABSTRACT

The invention relates to an electromagnetically releasable friction safety brake with two brake discs (2, 11) which are arranged on a common central drive shaft to be axially displaceable but non-rotatable with respect to the shaft. Axially disposed between the two brake discs (2, 11) in a spool carrier (5) is a magnetic coil (6) and springs (7) that urge the brake discs (2, 11) into the braking position. To solve the problem of simplifying such a brake further saving cost and space without detracting from the functional safety of the brake, it is envisaged that the electromagnet consisting of the magnetic coil (6) and the spool carrier (5) that surround the central shaft or hub are axially displaceable but non-rotatable in the brake, that a single armature disc (3) which is also axially displaceable but non-rotatable in the brake is arranged between the two brake discs (2, 11) and the magnetic coil/spool carrier, and that the springs (7) are tensioned axially between the magnetic coil/spool carrier, and the single armature disc (3). In an alternative arrangement, the drive shaft takes the form of a boss surrounding the brake assembly. Brake discs have radially outwardly facing splines that engage radially inwardly facing splines within the boss. In a linear version of the brake, the brake discs are replaced by the cables or webs of external equipment.

20 Claims, 5 Drawing Sheets

ELECTROMAGNETICALLY RELEASABLE FRICTION SAFETY BRAKE

BACKGROUND OF THE INVENTION

The invention concerns an electromagnetically releasable friction safety brake with two brake components that are independent from one another.

For safety reasons official regulations often specify that two separate braking systems be provided in plant and machinery so that if one braking system fails the necessary safety is still provided. This is particularly the case with elevators and lifts in accordance with lift regulation TRA200 and EN81.

In document DE-U-295 10 828 in the name of the firm Chr. Mayr. GmbH & Co KG. two brakes are built together in one unit. This is a cost effective and space saving arrangement of providing two separate and independent brakes.

The known arrangement includes two armature discs, two brake discs, two spring arrangements to urge the armature discs against the brake friction plates and a single electromagnet with a magnetic solenoid in the middle between the armature discs and the brake friction plates.

This known brake is functionally effective but consists of very many components.

Document EP-A-0 078 944 shows an electromagnetically released friction safety brake with a single brake disc. In this arrangement the magnetic solenoid is axially movable in the magnet housing.

Document U.S. Pat. No. 3,446,322 concerns an electromagnetic clutch with an independently driven auxiliary clutch or brake with two concentrically arranged magnetic solenoids and a single brake disc.

Document U.S. Pat. No. 4,878,568 includes a description of an electromagnetic clutch-brake assembly with a single clutch plate and a single brake disc.

From document DE-C-300 941 it is known to provide a spring brake which is released by the force of an electromagnet with a single armature disc and a single brake disc which has arranged on both sides brake pads. In this arrangement the armature disc and the magnet housing are supported in such a way that they are movable axially and are subject to the force of springs of various strengths acting in opposite directions of which the stronger is the brake spring.

As the arrangement described in this document only has a single brake disc it does not comply with the safety requirements of regulations TRA200 and EN81. There are also no indications in this document as to how its subject matter could be modified to fulfill the safety requirements without a disproportionate amount of technical engineering resources.

Document EP-A-0 465 831 relates to a safety disc brake for a lift with two-part systems which work mechanically completely separately from one and other. The part systems are in the form of two identical brake levers each with a separate spring actuating spring that are supported on a common spring reaction center that is in turn fixedly attached to a part of the machine. The releasing function of the brake is achieved by means of a cup shaped electromagnet which is firmly attached to a brake lever. The fixing of the cup shaped electromagnet and the armature disc on the brake lever are adjustable so that the armature disc is always pulled exactly parallel by the cup shaped electromagnet.

The subject of EP-A-0 465 831 however requires considerable resources i.e. is built from a relatively large number of components and needs a relatively large space. It is also a disadvantage that the brake of EP-A-0 465 831 cannot be released manually.

Document DE-C-29 01 784 discloses adjusting apparatus for the air gap of an electomagnetically actuated disc brake in which the magnet housing is axially slidable with the help of the adjusting components on axially arranged pins that are fixedly attached to the machine housing.

In document DE-U-17 68 425 in connection with a brake with a brake releasing magnet the prior art is described as including a magnet housing that is axially slidable.

Document DE-U-19 14 395 concerns an arrangement for releasing in an emergency an electromagnetic disc spring brake by means of a releasing lever.

In the article by W Baumann "Bauarten und Eigenschaften Elektromagnetisch gelüftete Bremssen und Stoppmotoren" (constructional types and characteristics of electromagnetically released brakes on stop motors) in "Konstruktion", 21,1969,H.4.pages 137–147 teaches that in such brakes a manual release can be provided which uses a stirrup which spans the brake by 180 degrees. Another manner of manual release is achieved by pressing together pins that are mounted on the brake linings to the right and left of the energizing winding.

In the four last mentioned documents there is no indication how the equipment described therein could be used in a safety brake with two brake discs.

SUMMARY OF THE INVENTION

The present invention as the object of simplifying such a brake further and to make it less expensive and also to save space without reducing its functional safety.

Further it should be possible to release the brake by hand.

In addition it should be possible to carry out a function and/or status check of the brake.

These and other objects are solved with the arrangements as defined in the accompanying claims.

BRIEF DESCRIPTION OF THE DRAWINGS

There now follows a description of an exemplary embodiment of the invention making reference to the following drawings in which.

DETAILED DESCRIPTION

Figure 1:
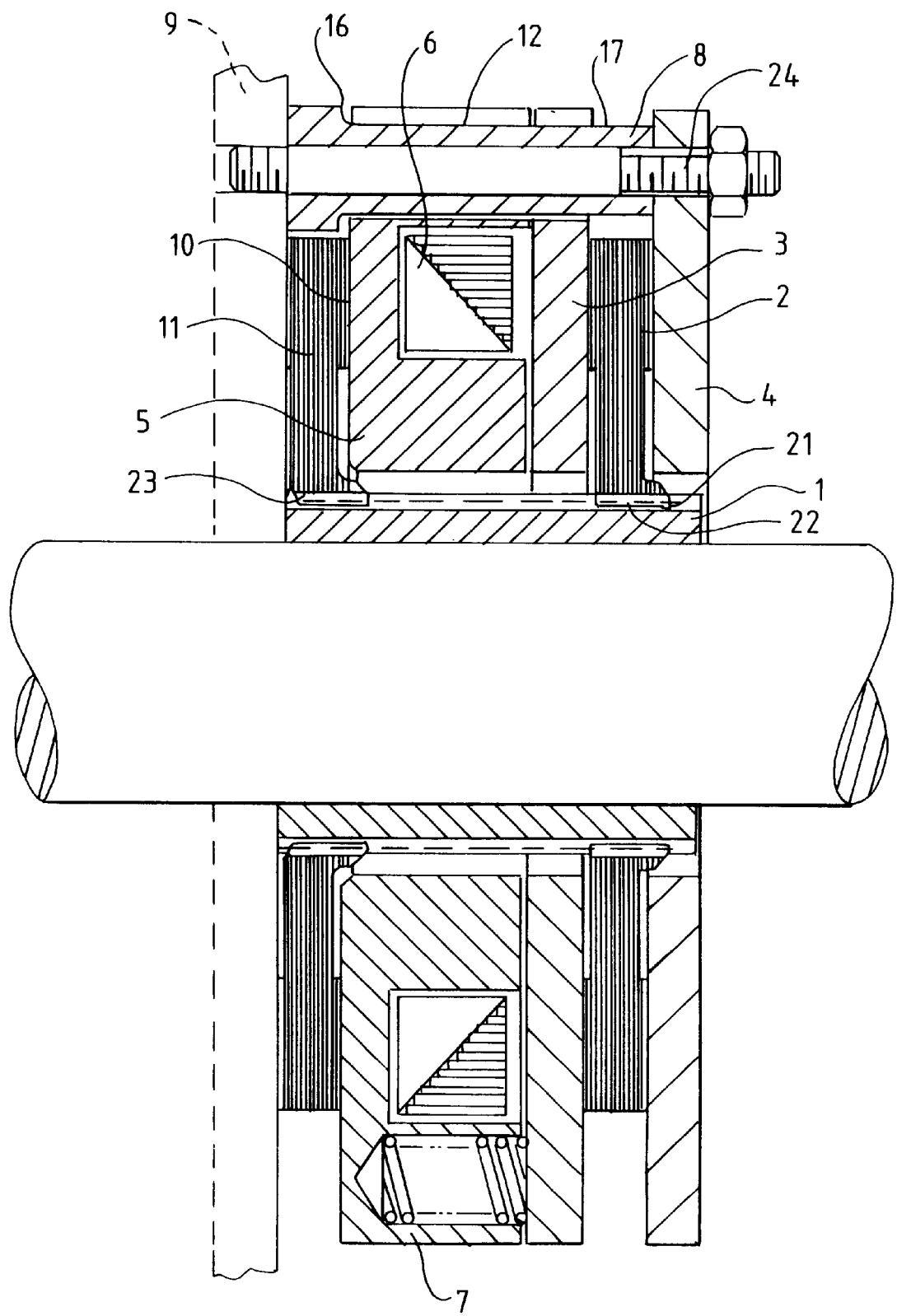
FIG. 1 is a longitudinal section of a brake in accordance with the invention.

Referring to FIG. 1 a hub 1 is fixed on a central shaft for example by means of shrinking or possibly by other means such as a key and key way. The hub has longitudinally disposed splines. Two brake discs 2 and 11 that rotate with the shaft are provided with longitudinal splines 22 and 23 that fit with the splines on the hub such that the brake discs 2 and 11 are mounted on the hub, and hence on the shaft, in such a manner that they are slidable in the longitudinal direction but are non-rotatable with respect to the shaft. Axially inwardly from one of the brake discs 2 there is an armature disc 3 of a magnetic material that is disposed in the brake in a slightly different way that will be explained below but which is also longitudinally displaceable (floating) but non-rotatable. Further axially inwards and attached to the armature disc 3 is a spool carrier 5 composed of an electromagnetic material. This spool carrier 5 is open on the side facing the brake disc 2 and the armature 3 and on tile side facing the brake disc 11 has an end plate 10. The spool carrier 5 has an appropriately shaped recess in which a magnetic coil 6 is immovable embedded, for example by means of casting resin. The magnetic coil together with the spool carrier form the electromagnet of the brake. A flange plate 4 forms the reaction plate for the brake disc 2 in its braking position and a machine wall 9 forms the reaction plate for the brake disc 11. A spring action comprising helical compression springs 7 that are arranged around the circumference of the spool carrier is provided only on one side and in the spool carrier 5 radially outwardly from the magnetic coil 6 and concentric with the axis. The machine wall 9 and the flange plate 4 are held apart by spacing pins in the form of bushes 8. Through the bushes 8 pass threaded bolts 24. The bushes 8 restrain the armature disc 3 and the spool carrier 5 from turning but allow a floating displacement in the longitudinal axial direction. Sealing rings 12 in corresponding grooves in the bushes 8 hold the spool carrier 5 in a central position. At the same time they reduce noise and provide damping.

Figure 4:
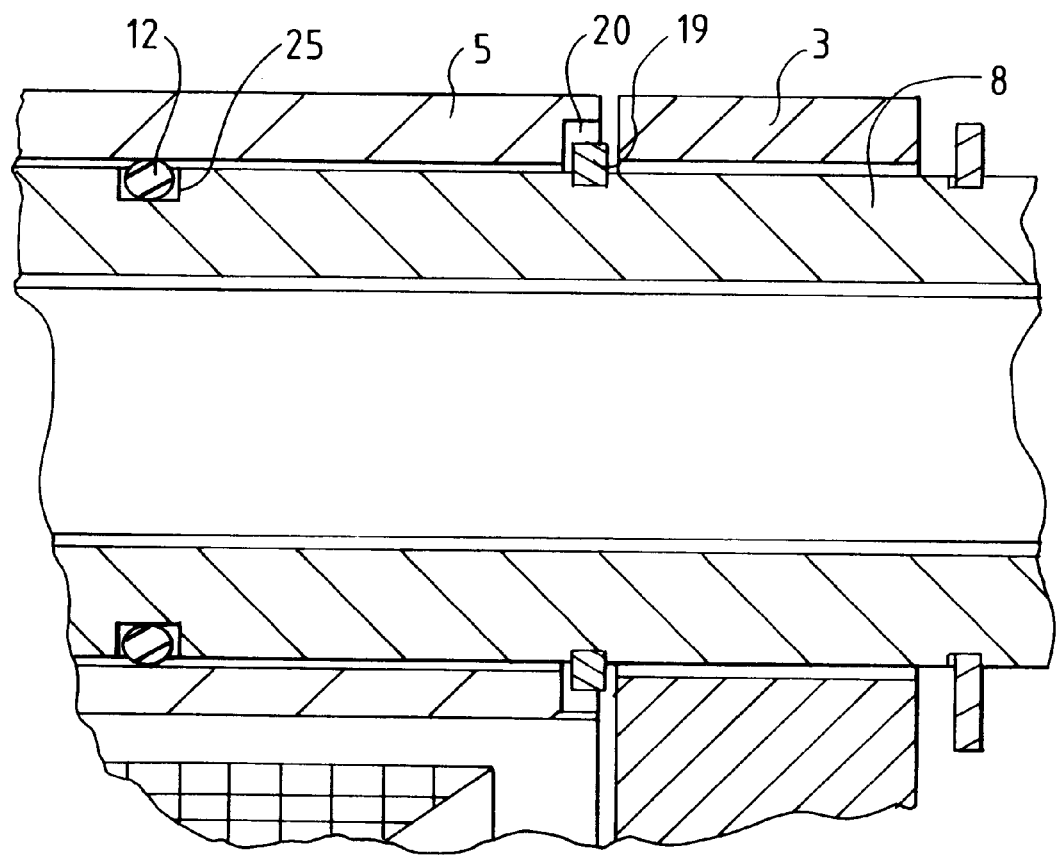
FIG. 4 is an enlarged view showing detail of the FIG. 1 arrangement.

Each of the bushes 8, which are circumferentially disposed around the brake (although only one is visible in the drawing) is provided with a circlip 19 that sits in an appropriately shaped groove or the like in the region of the junction between the spool carrier 5 and the armature disc 3. A recess 20 is provided in the right-hand end face of the spool carrier to accommodate the circlip. As shown in FIGS. 1 or 4 the armature disc 3 can abut this circlip 19 from the right and the spool carrier 5 can abut it from the left. This happens in the energized state of the electromagnet i.e. in the released state of the brake and has the effect that the armature disc 3 and the spool carrier 5 in this condition are positioned in an exactly defined axial position in the brake even or though these parts are otherwise disposed in an axially displaceable or floating condition.

The circlip 19 allows a more clearly defined separation of the spool carrier 5 and the armature disc 3 from the two brake discs 2 and 11. However during vertical operation of the brake the spool carrier and the armature disc are restrained by the circlip 19 i.e. there is no force due to the weight of the spool carrier and the armature disc on the brake disc.

Figure 2:
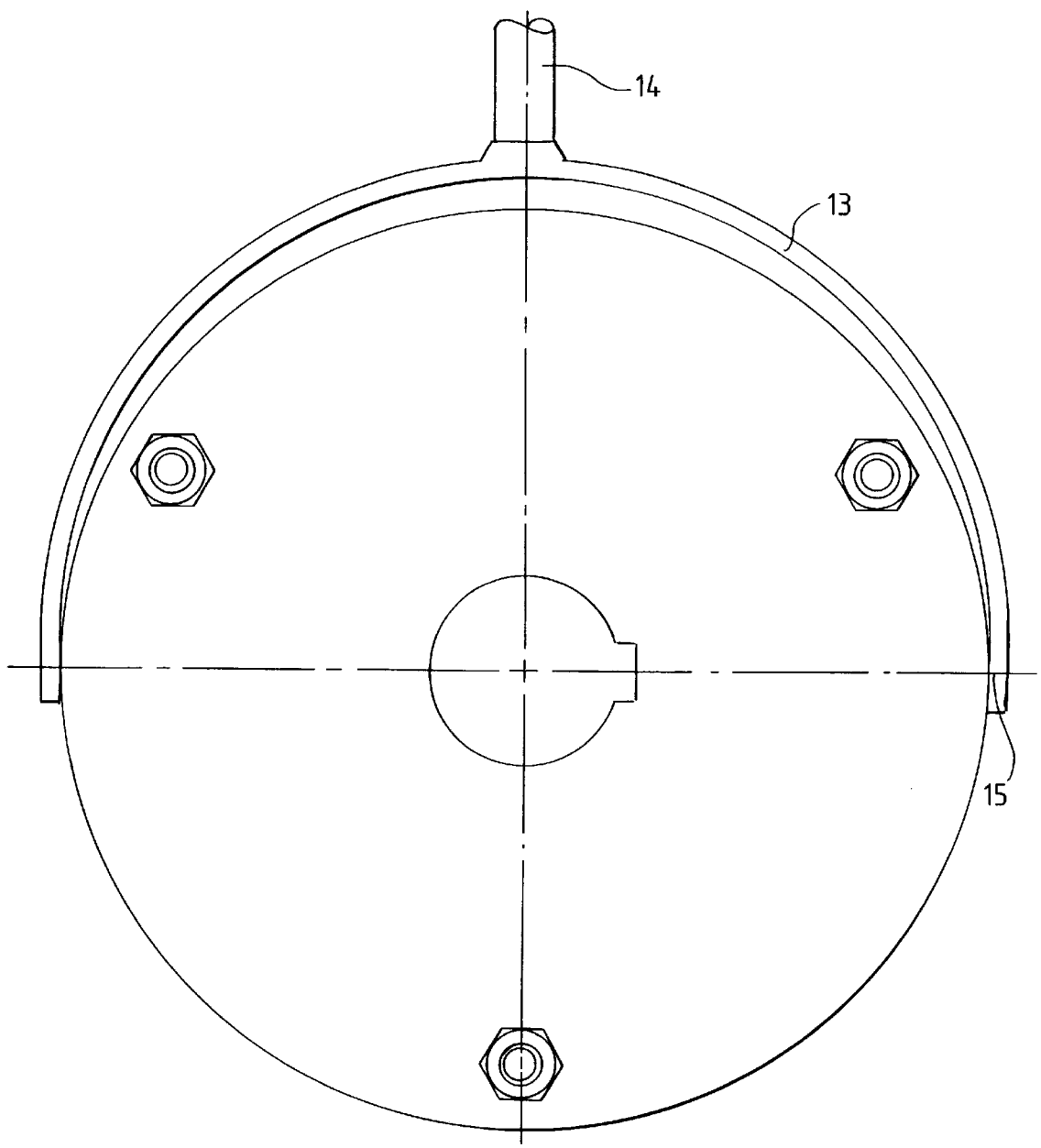
FIG. 2 is a front elevation of the exemplary embodiment.
Figure 3:
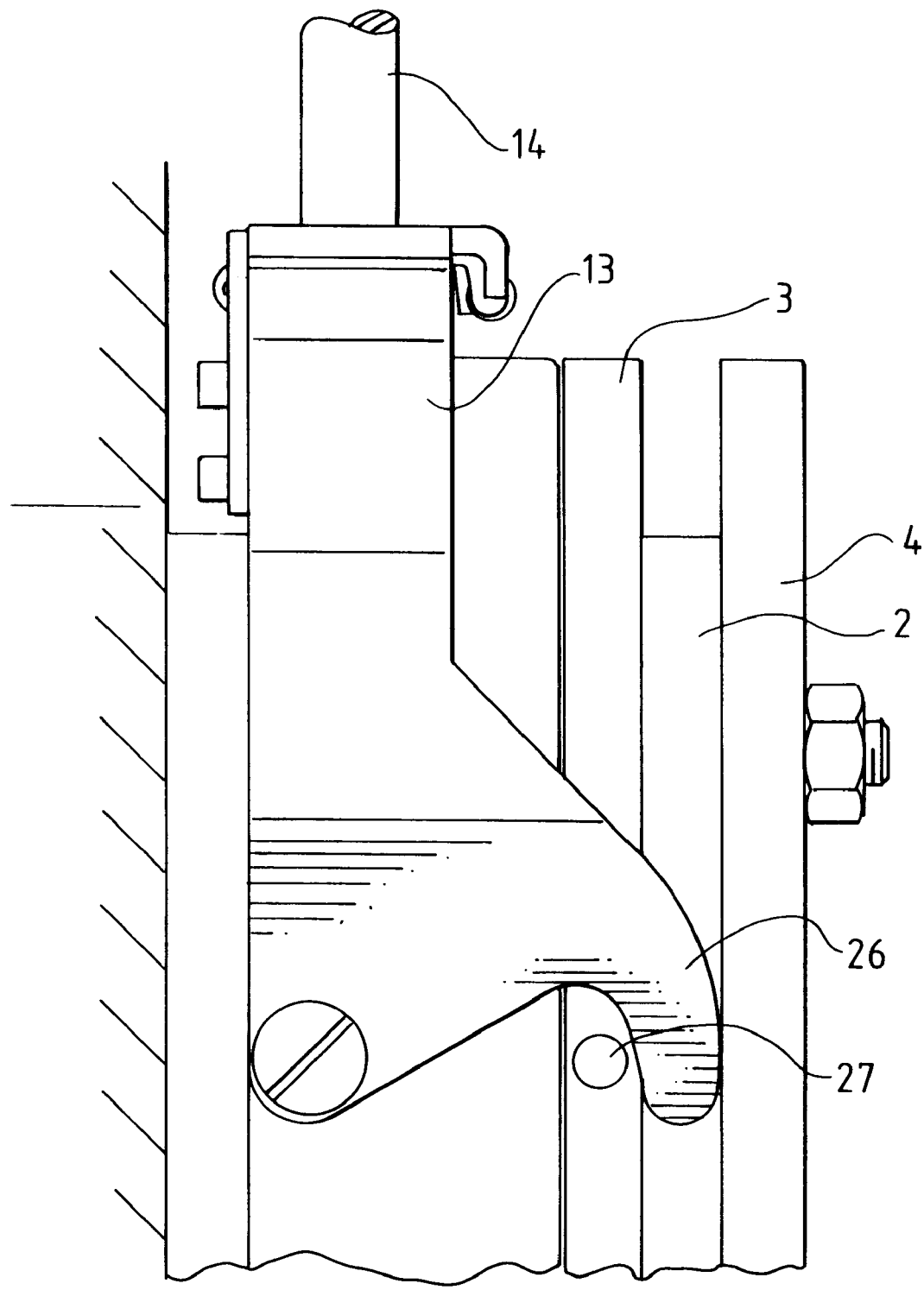
FIG. 3 is a side view of the same brake.

In FIGS. 2 and 3 there is shown an arrangement to release the brake manually, for example when it is necessary to move a lift that has stopped between floors due to a power failure, so that the occupants can get out safely. This device consists of a semi-circular release stirrup 13 which spans the brake typically by 180 degrees and is mounted on the spool carrier 5 in a swivelable and tiltable manner and a release handle 14 by which the release stirrup 13 can be pivoted. The release stirrup preferably has on both sides a nose 26 and which engages with a radially disposed pin 27 on the outer circumferential surface of the armature disc 3 to force the armature disc 3 against the spool carrier 5 against the force of the springs 7, when the magnetic coil 6 is not energized thereby bringing the armature disc 3 out of frictional and breaking engagement with the flange plate 4. The nose 26 is shaped and positioned with respect to the pin such that in the standby position i.e. when the brake is not being manually released the nose is not exerting any force on the pin. As the release handle is moved a camming surface on the nose engages the pin and forces the armature disc 3 and electromagnet 5, 6 together against the force of the springs 7. At the same time the frictional contact between the brake disc 11 and the wall of the machine 9 is released. When the release handle 14 is released the springs 7 urge the brake discs 2 and 11 again into the braking position. On account of their floating mounting the distance between the spool carrier 5 and the armature disc 3 is increased by the compression springs 7 until the brake discs 2 and 11 rest against their corresponding reaction surfaces 4 and 9.

The circlip 19 described above also brings an advantage in connection with the described manual release of the brake. On manual release the pulling force on the handle creates the moment that tends to press the floating part (arm attire disc, spool carrier) skew against the brake disc. The circlip however prevents this.

In a manner not described care is taken to ensure that the two parts of the brake can be tested separately from one and other by ensuring that the brake assembly can be accessed from outside at appropriate places. Elements, for example wedges, can be placed in one of the brakes and thereby disable it temporarily so that the other brake can be checked independently for proper function. The axially movable and yet non-rotatable disposition of the electromagnet/spool carrier and/or the one armature disc and the spring arrangement between them makes it possible to save one armature disc and spring assembly. The brake is thereby simplified, and is able to be made less expensively, and is more compact while achieving the same performance.

The operation of the brake will now be described. In the non-energized (without electric current) condition of the magnetic coil 6 the springs 7 are circumferentially disposed in the floating electromagnet/spool carrier 5 urge the spool carrier 5 and the armature disc 3 apart. The brake disc 2 is thereby pressed against the flange plate 4 and the brake disc 11 against the machine wall 9. Friction between the brake discs 2 and 11 and their reacting surfaces 4 and 9 causes the braking effect. The whole braking moment of the four brake surfaces is in this way imparted to the machine wall 9.

If the magnetic coil 6 is energized this pulls the armature disc 3 against the pressure of the springs 7 and the brake discs 2 and 11 are released allowing the hub 1 to rotate with the shaft and the brake discs 2 and 11. The spool carrier 5 and the armature disc 3 are on the two sides of the circlip 19. This ensures that in the released condition of the brake and always are at an exactly defined axial position in the brake.

If the electric current is switched off whether it be accidental for example in the case of a power failure, or automatically the magnetic coil 6 becomes de-energized and the springs 7 press the armature disc 3 and the spool carrier 5 apart thereby bringing the brake discs 2 and 11 into frictional braking contact. In the situation in which one of the braking circuits is out of action for example because one of the brake discs is jammed the other can still perform the safety function fully.

The brake may further be improved by constructing the bushes 8 in such a way that if one of the brake discs 11, 2 should break or be removed the axially movable spool carrier 5 or the armature 3 comes to rest against a shoulder on the bush 16 or a safety ring 17.

The shoulder thus limits the movement of the spool carrier to the left in FIG. 1 in the event of a failure of brake disc 11. The safety ring 17 limits the movement of the armature disc 3 to the right in FIG. 1 in the event of the brake disc 2. In this way the braking performance of at least one brake disc 11, 2 is ensured.

Further the bush 8 can be composed of two parts so that a lock of the brake discs 11, 2 can be compensated for by adjustment.

Another modification that can be made is to arrange for the compression springs 7 to be settable and adjustable in spring force continuously by appropriate means.

Figure 5:
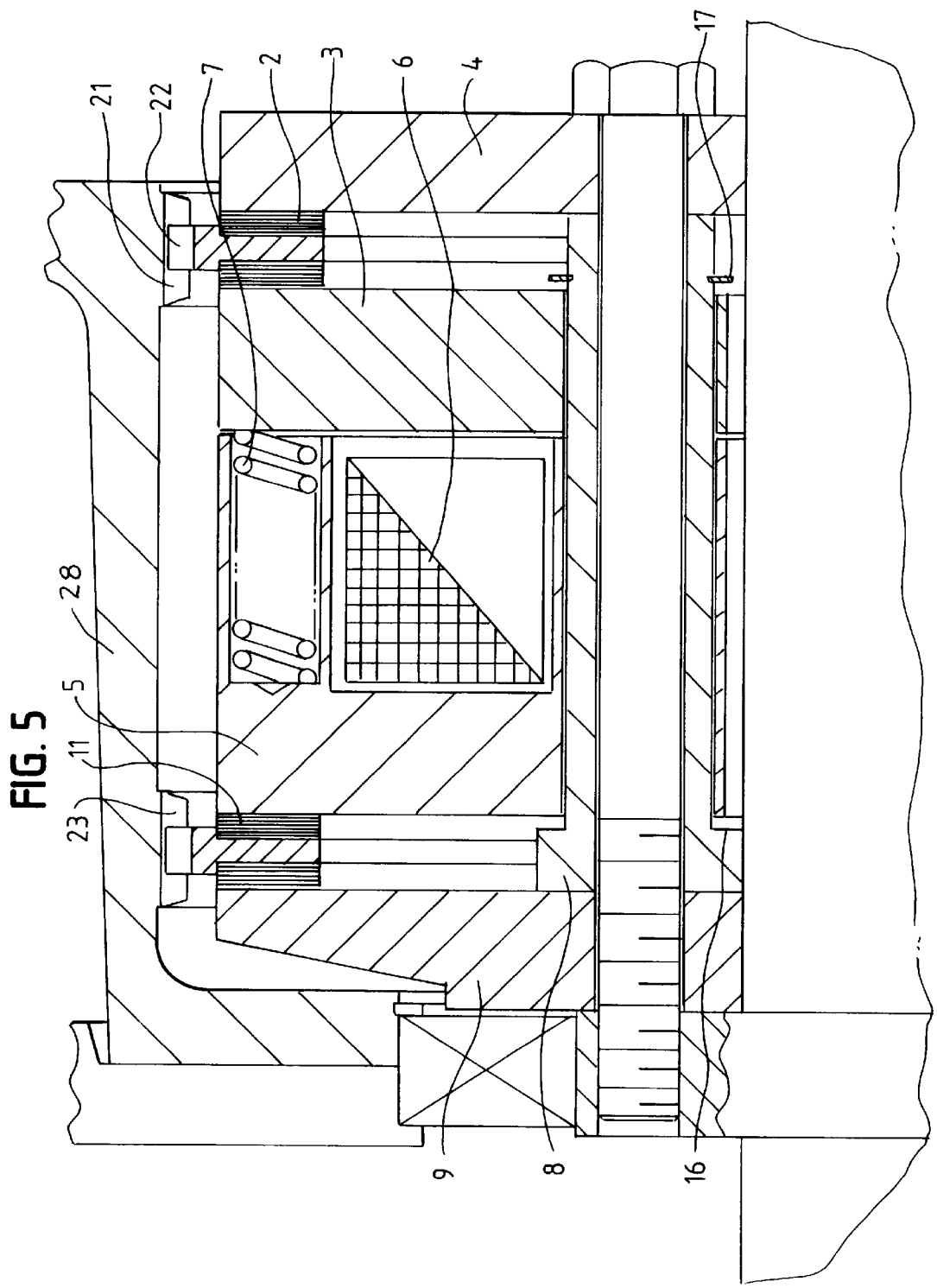
FIG. 5 is a longitudinal cross-section of a second embodiment of the invention.

Whereas the invention has been illustrated above by reference to a first embodiment in which the brake discs 2, 11, electromagnet/spool carrier 5 and armature disc 3 surround a drive shaft, in a second embodiment these components are inside a rotating cylindrical boss 28. FIG. 5 shows such an arrangement. The reference numerals correspond to the numerals used for similar parts in the first embodiment. The brake discs have outwardly facing teeth 22, 23 to engage inwardly facing splines 21 on the inner surface of the boss. This enables the brake discs 2, 11 to be free to move in an axial direction, and yet rotate with the rotating boss. Instead of spacing pins holding an end plate 4 in a spaced relationship with the machine wall, in the second embodiment there is a central stationary shaft passing through the brake. The end plate 4 is secured to this shaft. A further plate 9 and the end plate 4 form two frictional surfaces facing each other. As in the first embodiment two brake discs 2, 11 are disposed inwardly from these friction surfaces. An electromagnet assembly 3, 5, 6, 7 similar to that described in respect to the first embodiment is positioned between the two brake discs 2, 11 and has two outwardly facing friction surfaces. One of these outwardly facing friction surfaces is the outer surface of an armature plate 3 and the other is the base plate of an electromagnet/spool carrier 5, 6. The electromagnet assembly 3, 5, 6, 7 is able to float in an axial direction but is constrained against movement in the direction of the movement of tile two brake discs i.e. rotary movement for example by splines or grooves in the central stationary shaft. The electromagnet assembly also contains resilient means for example helical compression springs 7 which urge the armature 3 away from the electromagnet 5, 6 thereby forcing the outwardly facing friction surfaces apart and into friction engagement with the two brake discs. As with the first embodiment the arrangement of this second embodiment can include a circlip (not shown) or other suitable detent to limit the movement of the spool carrier 5 in the direction of the armature 3 and the armature 3 in the direction of the spool carrier 5. The function of this detent is to locate the armature and the spool carrier in a fixed position in the situation in which the brake is released. It also serves as a stop to prevent the lower brake binding when operated in a vertical orientation and it improves the security of the remaining brake in the situation which one brake fails. These advantages have already been explained above in respect of the first embodiment.

What is claimed is:

1. A safety brake assembly for material or personnel transporting machinery, which provides a braking effect between a housing and two brake discs which rotate with respect to the housing, comprising:
    a housing having two friction surfaces facing each other and held apart by one or more spacing rods, each carrying a bush;
    the two brake discs disposed inwardly from the friction surfaces of the housing;
    an electromagnet assembly between the two brakes discs and having:
    an armature disc,
    two outwardly facing friction surfaces,
    resilient means to urge the outwardly facing friction surfaces apart and into frictional engagement with the two brakes discs, and
    an electromagnet to pull the friction surfaces together and out of engagement with the two brake discs; the brake discs being free to move in an axial direction; the electromagnet assembly being floatingly disposed between the two brakes discs thereby allowing free movement in the said axial direction, the electromagnetic assembly being constrained against rotational movement by the one or more spacing rods.

2. A brake assembly according to claim 1, wherein the brake discs are mounted on a hub in an axially displaceable but non-rotatable manner by means of longitudinal splines.

3. A brake assembly according to claim 1, wherein the spool carrier has a recess on the side facing one brake disc and on a side facing the other brake disc is provided with an end plate that serves as a frictional surface.

4. A brake assembly according to claim 3, wherein said resilient means include compression springs between the electromagnet and the armature disc, arranged in a circle and being seated in corresponding bores in the spool carrier.

5. A brake assembly according to claim 4, wherein there is provided apparatus for releasing the brake manually, by forcing the armature disc against the electromagnet against the force of the springs.

6. A brake assembly according to claim 5, wherein the apparatus for releasing the brake manually comprises a pivotally mounted release stirrup which is semi-circular and spans the brake, a release lever extending in the direction of an axis of the release, a nose on the release stirrup that engages a pin on the armature disc and forces the armature disc in the direction of the spool carrier against the force of the springs thereby releasing the brake housing.

7. A brake assembly according to claim 1, wherein outer surface of the brake is open thereby allowing functional and/or status checking.

8. A brake assembly according to claim 1, comprising a first braking circuit consisting of a first of the housing friction surfaces, the electromagnet assembly and a first of the two brakes discs, and a second braking circuit consisting of a second of the housing friction surfaces, the electromagnet assembly and a second of the two brake discs are open for inspection.

9. A brake assembly according to claim 3, wherein the spool carrier is centralized by means of sealing rings disposed on the bushes.

10. A brake assembly according to claim 9, wherein the sealing rings have a silencing and/or damping effect, and that they centralize the electromagnet and armature disc.

11. A brake assembly according to claim 3, wherein a circlip is provided on each of the bushes between the spool carrier and the armature disc on which the spool carrier and the armature disc come to rest when the brake is in the released condition.

12. A brake assembly according to claim 3, wherein the bushes are arranged in such a way that if one of the brake discs becomes inoperable the spool carrier or the armature disc, respectively, comes to rest against a shoulder on the bush or a safety ring to ensure braking performance of one brake disc.

13. A brake assembly according to claim 1, wherein the bush is composed of two parts so that a lock of the brake discs can be compensated for by adjustment.

14. A brake assembly according to claim 4, wherein the compression springs can be set and adjusted in spring force continuously by appropriate means.

15. A brake assembly according to claim 1, wherein there is provided a hub surrounding the brake assembly which has inwardly facing splines which engage outwardly facing on the brake discs.

16. A brake assembly according to claim 1, wherein a rotatable hub surrounds the brake assembly, and which has inwardly facing splines which engage outwardly facing splines on the brake discs.

17. A brake assembly according to claim 16, wherein a central stationary shaft passes through the brake assembly, and the hub is adapted to rotate together with the brake discs.

18. An electronically releasable friction safety brake with two axially displaceable brake discs and an electromagnet assembly that is disposed axially between the two brake discs and which has springs that urge the brake discs into a braking position, wherein the electromagnet assembly is axially displaceable but non-rotatable in the brake, and has an end plate that is arranged to be a friction surface, including a single armature disc which is also axially displaceable but non-rotatable in the brake and axially disposed between one of the two brake discs and the electromagnet assembly, wherein the springs are axially compressed between the electromagnet assembly and the single armature disc and wherein these being mounted inside a rotating cylindrical boss.

19. A safety brake according to claim 18, wherein the rotating cylindrical boss surrounding the brake assembly has inwardly facing splines which engage outwardly facing splines on the brake discs.

20. A safety brake according to claim 18 or 19, wherein there is a central stationary shaft passing through the brake, assembly and the rotating cylindrical boss is rotatable together with the brake discs.

* * * * *